United States Patent Office 3,398,173
Patented Aug. 20, 1968

3,398,173
PROCESS FOR PRODUCING SILOXANES
John C. Goossens, Scotia, N.Y., assignor to General
Electric Company, a corporation of New York
No Drawing. Filed Oct. 1, 1964, Ser. No. 400,922
10 Claims. (Cl. 260—448.2)

ABSTRACT OF THE DISCLOSURE

A dichlorosilane reacts with a diorganosulfoxide in diluent solution to form a cyclotrisiloxane. Cyclotrisiloxanes are particularly useful in the formation of high molecular weight polymers suitable for use in the preparation of silicone rubber wire insulation.

---

This invention relates to the preparation of cyclopolysiloxanes. More particularly, it relates to a single step formation of cyclotrisiloxanes.

In the preparation of siloxane polymers, especially high molecular weight polymers suitable for use in preparation of elastomers, the preferred starting material is a cyclopolysiloxane. In many cases, the use of the cyclotrisiloxane is necessary. Previous methods employed in the production of such cyclotrisiloxanes have often resulted in poor yields, and in some cases, in the inability to produce the cyclic siloxane at all. The method of the present invention produces these cyclic siloxanes with economic yields.

Exemplary of previous methods are controlled hydrolyses and the reaction of a tetraorganodisiloxanediol with a diorganodichlorosilane. For example, a controlled hydrolysis of diphenyldichlorosilane will produce a yield of only 60% of the hexaphenylcyclotrisiloxane. Another process, which is described in British Patent 941,501, shows the formation of a hexaorganotrisiloxane dichloride and its subsequent hydrolysis to the cyclotrisiloxane. The resultant yield is much lower than that which can be achieved by the present invention.

Additionally, a process has been shown involving the partial hydrolysis of a diorganodichlorosilane to a tetraorganodichlorodisiloxane followed by a carefully buffered hydrolysis of this disiloxane to form the disiloxanediol. The diol is then reacted with additional diorganodichlorosilane in the presence of an acid acceptor to form the cyclotrisiloxane. However, while this process is generally adequate, it is ineffective for some materials and, for others shows only very low yields. For example, when the starting silane was di-m-tolyldichlorosilane, this process achieved a yield of only 20%. On the other hand, using the same starting silane, the process of the present invention showed a yield of 70% of the crude material and 63% of the purified material. Further, each of the processes previously described involves a multistep operation.

It is an object of the present invention to provide an improved method for preparing cyclotrisiloxanes which produces an economic yield of the product.

It is a further object of this invention to provide an improved method for forming cyclotrisiloxanes in a single step operation.

These and other objects are accomplished in the present invention by reacting a monoorganodichlorosilane or a diorganodichlorosilane with a diorganosulfoxide. The desired cyclotrisiloxane is formed by the reaction along with an easily removable by-product. The reaction is carried out in the presence of a solvent, but in the absence of a catalyst. In the course of the reaction, the chlorosilane is hydrolyzed to a silanol according to the reaction:

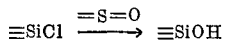

the silanol condensing to form siloxanes, the major siloxane being a cyclotrisiloxane of the formula:

(1)
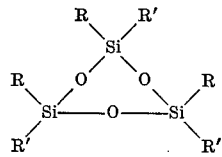

where R and R' are each selected from the group consisting of hydrogen, monovalent hydrrocarbon radicals and substituted monovalent hydrocarbon radicals, such as halogenated monovalent hydrocarbon radicals, cyano-substituted monovalent hydrocarbon radicals, and carbalkoxy-substituted monovalent hydrocarbon radicals.

Among the hydrocarbon radicals which R and R' represent are alkyl radicals, such as methyl, ethyl, propyl, isopropyl, etc.; alkenyl radicals, such as vinyl, allyl, etc.; alkynyl radicals, such as ethynyl, 1-propynyl, 2-propynyl, etc.; cycloalkyl radicals, such as cyclopentyl, cyclohexyl, etc.; aryl radicals, such as phenyl, naphthyl, biphenylyl, tolyl, xylyl, ethylphenyl, etc.; aralkyl radicals, such as benzyl, phenylethyl, etc. Among the substituted monovalent hydrocarbon radicals which R and R' represent are those having cyano, carbalkoxy, and halogen substituents, such as cyanalkyl radicals, e.g. β-cyanoethyl, γ-cyanopropyl, carbalkoxyalkyl radicals, e.g., halogenated derivatives of the above described hydrocarbon radicals, e.g., chloromethyl, dibromophenyl, etc.

The dichlorosilane used in the process of the present invention has the formula:

(2) 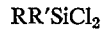

where R and R' are as defined above.

The diorganosulfoxide used in the reaction is represented by the formula:

(3) 

where R" is a monovalent hydrocarbon or substituted monovalent hydrocarbon radical, such as those selected from the class consisting of alkyl radicals having 1 to 3 carbon atoms, phenyl radicals, benzyl radicals, chlorophenyl radicals and further radicals where the two R" radicals taken together with the

group form a heterocyclic ring containing one sulfur atom and a 5 to 6 carbon atom alkylene chain, with the further condition that at least one R" must have an aliphatic alpha-hydrogen atom. Exemplary of specific materials which can be used are dimethylsulfoxide, methylphenylsulfoxide, methylbenzylsulfoxide, dibenzbylsulfoxide, diethylsulfoxide, methyl t-butyl sulfoxide, methyl p-chlorophenyl sulfoxide, and heterocyclic rings containing the sulfoxide radical where the two R" radicals together form a divalent radical such as pentylene and hexylene, Because of the ease of obtaining it, and its relatively low cost, dimethylsulfoxide is preferred.

The cyclotrisiloxane which is formed from the silane of Formula 2 exists in two isomeric forms where R and R' are different. That is, when R and R' represent different monovalent radicals, such as, for example, in methylphenyldichlorosilane, the cyclotrisiloxane which is formed can be either cis-cis or cis-trans. The cis-cis isomer of this product has a melting point of 100° C., while the cis-trans isomer has a melting point of 41° C.; the boiling points of both isomers are approximately 60° C. at 0.1 mm. For the purposes of the present invention, this difference is immaterial and the yield of cyclotrisiloxane noted in the various examples includes both forms.

The process can be carried out by mixing or contacting the dichlorosilane and the diorganosulfoxide in any desired manner. However, it is preferable that the dichlorosilane be added to the diorganosulfoxide, rather than vice versa. While the cyclotrisiloxane is formed preferentially in either case, the ratio of the cyclotrisiloxane to the cyclotetrasiloxane is considerably higher when the silane is added to the sulfoxide and the other variables are within acceptable ranges. Addition of the silane to the sulfoxide can result in a ratio of 13:1 of the cyclotrisiloxane to the cyclotetrasiloxane, while the reverse addition produces a ratio of from 3:1 to 6:1.

It is important that the reaction be conducted in a solvent, as by dissolving each of the reactants in a portion of the solvent and adding one of the solvent solutions to the other. The solvent is not necessary for the reaction to proceed, but only to absorb the heat generated in the reaction and thus aid in controlling the rate of addition. The yield and ratio of reactants is not significantly affected by the amount of solvent employed, so long as it is above the minimum amount necessary for heat absorption. There is essentially no limit to the amount of solvent which can be utilized except for that imposed by the increased problem of removing it at the completion of the reaction. The minimum amount of solvent which is utilized is that below which control of the reaction is lessened and the yield drops. This minimum amount is about 125 ml. of solvent for each mole of the silane and about 75 ml. of the solvent for each mole of the sulfoxide. A preferred amount is about 175 ml. of solvent per mole of silane and 90 ml. of solvent per mole of the sulfoxide.

The solvents which can be used in the reaction include essentially any aromatic compound or aromatic compounds having substituents which are inert to the reactants, particularly alkyl substituents. As examples, toluene, benzene, and cumene are particularly advantageous. Additionally, solvents such as tetrahydrofuran, acetonitrile, diethyl ketone, and methylacetate perform satisfactorily. However, the yield and ratio of cyclotrisiloxane to cyclotetrasiloxane are generally much higher with the first-mentioned group. Using normal operating procedures, no material with which the sulfoxide is immiscible is satisfactory alone. Exemplary of immiscible materials are the paraffins, such as heptane. However, such a material may be utilized to dissolve the silane when the sulfoxide is dissolved in one of the solvents in the preferred group. Thus, excellent results are obtainable if the dichlorosilane is dissolved in, for example, heptane while the sulfoxide is dissolved in, for example, toluene. Additionally, if the sulfoxide is well dispersed in such an immiscible material and addition is rapid, the reaction proceeds although the results achieved are not optimum.

The reaction between the sulfoxide and the dichlorosilane is essentially in a 2:1 molar ratio and preferably this is the ratio used. However, two variables do affect the ratio of reactants which should be utilized: (1) some silanol-containing compounds are formed which react with the dichlorosilane to form the cyclosiloxane and (2) the hydrochloric acid produced in the reaction attacks the diorganosulfoxide, particularly at high temperatures. Due to the effect of these variables, the ratio of sulfoxide to silane should be in the range of from 1.5 to 3.0 moles per mole, preferably from 1.7 to 2.2. The limit of 3.0 moles of sulfoxide per mole of silane is suggested only to limit the problems of removing the sulfoxide following completion of the reaction. There is no maximum limit to the amount of sulfoxide which may be used except for this problem of removal. Below the minimum level of 1.5 moles of sulfoxide per mole of silane, the yield begins to drop off and the reaction mixture contains unreacted dichlorosilanes and partially converted intermediates, particularly monomeric and dimeric silanols.

The temperature at which the reaction is carried out is also important. At low temperatures, the conversion to cyclosiloxanes is lowered and considerable amounts of linear silanols remain, even after heating the reaction mixture upon completion of the addition of reactants. As the reaction temperature is increased, the conversion to cyclosiloxanes increases and the ratio of the cyclotrisiloxane to the cyclotetrasiloxane becomes more favorable. However, if the temperature is raised above the decomposition point of the sulfoxide, the decomposition becomes a serious competing side reaction and results in a less complete reaction of the dischlorosilane. As an example, dimethylsulfoxide decomposes at about 80° C. under the acid conditions present in the reaction mixtures described in this application. The preferred reaction temperature is between 50° C. and 70° C.

The reaction between the dichlorosilane and the diorganosulfoxide is exothermic and occurs essentially instantaneously at temperatures within or close to the preferred range. It is very vigorous. The reaction time is limited only by the problems in maintaining the reaction temperature. As an example, when reacting 0.2 mole of sulfoxide with 0.1 mole of silane, the reaction requires about 20 to 30 minutes with a dropwise addition. The reaction time can be reduced to as little as 5 to 10 minutes by using additional solvent, with its concomitant problems, or by supplying external cooling to the reaction vessel. On the other hand, using larger amounts of reactants, for example, the reaction may require one hour or more to complete. The reaction should be run in the absence of a catalyst.

Following reaction of the silane and the sulfoxide, the method of recovering the cyclotrisiloxane from the reaction mixture depends upon the physical state, under standard conditions, of the siloxane to be recovered. When the cyclotrisiloxane is a liquid, it may be recovered by a distillation which removes the remaining sulfoxide, its byproducts, and the solvent; generally when the final cyclotrisiloxane is a solid, it is recovered by recrystallization from a suitable solvent, such as benzene, toluene, pentane, or acetonitrile.

The following examples are illustrative of the process of this invention. They should not be considered as limiting in any way the full scope of the invention as covered by the appended claims.

The following seven examples show the formation of hexaphenylcyclotrisiloxane. In each of the examples, the reaction product weighed approximately 27 grams, as compared with a theoretical yield of 27.4 grams.

Example 1

A mixture was prepared containing 22 g. (0.28 mole) of dimethylsulfoxide and 25 ml. of heptane. This mixture was stirred so that the sulfoxide was present in small droplets and to it was added, dropwise, over a period of approximately 25 minutes, a solution containing 35 g. (0.14 mole) of diphenyldichlorosilane and 25 ml. of heptane. The temperature, during the addition, was maintained at 60° C. The product was not completely soluble in the reaction mixture and separated as a white solid during the course of the reaction. The product, as determined by V.P.C. (vapor phase chromatography) was a mixture, 18% of which was tentatively determined to be dimer, 63.5% of which was the cyclotrisiloxane, 6% of which was the cyclotetrasiloxane, and 12.5% of which was composed of other siloxane materials. The relative incompleteness of cyclosiloxane formation was the result of the immiscibility of the sulfoxide in heptane.

The crude reaction product was distilled to a pot temperature of 120° C. to remove the solvent and volatiles. When the residue from the distillation was cooled, a brown, sticky, crystalline mass resulted. This crystalline mass was moistened with about 8 ml. of methanol and stirred to form a slurry; the methanol dissolved any silanols which remained after the distillation. The crystals in the methanol slurry were crushed and the slurry was then rapidly dumped onto a Buechner funnel to remove the solvent. The crystals recovered from this Buechner filtration weighed 17 g. and analysis showed their composition to be 91.3% of the hexaphenylcyclotrisiloxane and 8.7% of the octaphenylcyclotetrasiloxane.

A 10 g. sample of the material treated as just described was placed in 7 ml. toluene and the mixture heated until the crystals dissolved. The heated solution was cooled slowly to room temperature and was subsequently placed in a refrigerator and cooled to about 5° C. Following cooling, the solvent was poured off and the resulting crystalline material dried of solvent by exposure to air until a constant weight was reached. The 8.35 g. yield was analyzed by V.P.C. and showed a cyclotrisiloxane content of 97.9% and a cyclotetrasiloxane content of 2.1%. The melting point of the treated material was from 187° C. to 190° C. as compared with a melting point of 190°–191° C. for pure hexaphenylcyclotrisiloxane. Another 5 g. sample of the methanol treated product was mixed with 5 ml. of benzene and treated in the same way as the sample mixed with toluene. A yield of 4.6 g. of material with a melting point of 182°–189° C. resulted. By V.P.C., this material analyzed 96.7% cyclotrisiloxane and 3.3% cyclotetrasiloxane.

Example 2

A solution was prepared containing 35 g. (0.14 mole) of diphenyldichlorosilane in 50 ml. of toluene. This solution was stirred and to it was added 22 g. (0.28 mole) of dimethylsulfoxide, while maintaining the temperature at 80° C. The addition required approximately 30 minutes. An infrared spectrum of the crude product mixture, after removal of the solvent and volatile by-products, showed no residual silanol while a V.P.C. analysis revealed 72% of the cyclotrisiloxane, 19% of the cyclotetrasiloxane, and 9% of other mixed siloxanes. The relatively low yield and less than optimum ratio of cyclotrisiloxane to cyclotetrasiloxane shows the effects of the 80° C. reaction temperature and the addition of the sulfoxide to the silane rather than vice versa.

The material is purified in a manner similar to that shown in Example 1.

Example 3

A solution was prepared containing 22 g. (0.28 mole) of dimethylsulfoxide in 25 ml. of toluene. To this was added, while stirring, a solution comprising 35 g. (0.14 mole) of diphenyldichlorosilane in 25 ml. toluene in a dropwise manner, while maintaining the temperature at 50° C. The addition took place over a period of about 30 minutes. An infrared spectrum of the crude product mixture indicated no residual silanol. The crude product analyzed, by V.P.C., 85.5% of the hexaphenylcyclotrisiloxane, 6.5% of the octaphenylcyclotetrasiloxane, and 8% of other mixed siloxanes. This was a ratio of 13.1:1 of cyclotrisiloxane to cyclotetrasiloxane. The material is purified in a manner similar to that shown in Example 1. Comparable results are obtained using cumene as the solvent in place of toluene.

Example 4

This example illustrates the poor yields which result from use of a reaction temperature above the decomposition point of the sulfoxide. A solution was prepared containing 22 g. (0.28 mole) of dimethylsulfoxide in 25 ml. of toluene. To this solution was added, dropwise, with stirring, a solution containing 35 g. (0.14 mole) of diphenyldichlorosilane in 25 ml. of toluene, while maintaining the temperature at 100° C. During addition of the silane, which required about 20 minutes, the generation of a considerable amount of paraformaldehyde was noted, indicating decomposition of the sulfoxide. An analysis by V.P.C. indicated that the reaction had not gone to completion. The combined peaks of those products having a lower molecular weight than the cyclotrisiloxane amounted to 43% of the crude product, while the trisiloxane represented only 41%. Additionally, the crude product contained 7.5% of cyclic tetrasiloxane and 8.5% of higher molecular weight siloxane materials.

Example 5

A solution was prepared containing 22 g. (0.28 mole) of dimethylsulfoxide in 25 ml. of toluene. To this solution was added, dropwise, with stirring, a solution of 35 g. (0.14 mole) of diphenyldichlorosilane in 25 ml. of toluene, while maintaining the temperature at 5° C. to 10° C. The addition consumed approximately 30 minutes. The infrared analysis of the resulting crude product showed about 5% of material containing uncondensed silanols, an indication of an incomplete reaction. The incompleteness of the reaction resulted from the use of a reaction temperature far below the preferred temperature range. However, notwithstanding the incompleteness of the reaction, almost 90% of the reaction product was composed of cyclic siloxanes, the greatest portion of which was the hexaphenylcyclotrisiloxane.

Example 6

A solution was prepared containing 22 g. (0.28 mole) of dimethylsulfoxide in 25 ml. of tetrahydrofuran. This solution was stirred and to it was added, dropwise, a solution containing 35 g. (0.14 mole) of diphenyldichlorosilane in 25 ml. of tetrahydrofuran, while maintaining the temperature at 50° C. The addition time was about 25 minutes. On infrared analysis of this crude product showed no uncondensed silanol. A V.P.C. scan showed 75% of the hexaphenylcyclotrisiloxane, 20.5% of the octaphenylcyclotetrasiloxane, and 4.5% of higher molecular weight materials. The effect of the acceptable, but not preferred, tetrahydrofuran solvent is seen in the relatively low ratio of cyclotrisiloxane to cyclotetrasiloxane.

Purification of this reaction product is accomplished in a manner similar to that described in Example 1. Similar results can be obtained when methyl p-chlorophenylsulfoxide is used as the reactant with the diphenyldichlorosilane.

Example 7

A solution was prepared containing 22 g. (0.28 mole) of dimethylsulfoxide in 25 ml. of diethylketone. This solution was stirred and to it was added, dropwise, a solution containing 35 g. (0.14 mole) of diphenyldichlorosilane in 25 ml. of diethylketone, while maintaining the temperature at 60° C. During the addition, which took place over a period of about 25 minutes, the reaction mixture discolored severely and at the finish, was black. An infrared spectrum revealed no uncondensed silanol and the V.P.C. scan revealed 70% of the cyclic trisiloxane, 23% of the cyclic tetrasiloxane, and 7% of other siloxane materials. The effect of the diethylketone on the cyclosiloxane ratio is similar to that of the tetrahydrofuran.

The following examples show the production of hexaorganocyclotrisiloxanes other than hexaphenylcyclotrisiloxane.

Example 8

The preparation of cyclic methylphenylsiloxanes is shown in this example. A solution was prepared containing 31 g. (0.4 mole) of dimethylsulfoxide in 75 ml. of toluene. This solution was stirred, and to it was added, dropwise, a solution containing 38 g. (0.2 mole) of methylphenyldichlorosilane in 25 ml. of toluene. The temperature was maintained at 60° C. during the addition, which required about 25 minutes. No silanol was detected in the 26.5 g. crude product mix by an infrared analysis. A V.P.C. analysis showed a total of 65% of the 1,3,5-trimethyl-1,3,5-triphenylcyclotrisiloxane, of which 18.5% was cis-cis and 81.5% was cis-trans. Additionally, the crude product contained 30% of mixed stereoisomeric cyclotetrasiloxanes, and 5% of other siloxane materials.

Purification of this material is accomplished by a fractional distillation under vacuum, followed by a recrystallization such as that described in Example 1. A similar crude product results when methylphenylsulfoxide is used in place of the dimethylsulfoxide.

Example 9

This example also illustrates the production of cyclic methylphenylsiloxanes. A solution was prepared containing 2 moles of dimethylsulfoxide in 200 ml. of tetrahydrofuran. This solution was stirred, and to it was added, dropwise, a solution containing 1 mole of methylphenyldichlorosilane in 100 ml. of tetrahydrofuran. The temperature, during the addition, was maintained at 5°–10° C. The addition was accomplished over a period of about 30 minutes. The solvent and volatile by-products were removed from the reaction mixture by distillation. Subsequently, a fractional distillation was run at 0.1 mm. pressure and the fraction boiling between 158° C. and 170° C. was collected. This represented both the cis-cis and the cis-trans isomers of 1,3,5-trimethyl-1,3,5-triphenylcyclotrisiloxane. The product was a pale yellow-green liquid in which high-melting isomer crystals appeared on standing. Purification can be accomplished by recrystallization from a suitable solvent as described in Example 1.

Example 10

In this example, the production of hexa-m-tolylcyclotrisiloxane is shown. A solution was prepared containing 15.5 g. (0.2 mole) of dimethylsulfoxide in 75 ml. of toluene. This solution was stirred and to it was added, dropwise, a solution containing 28 g. (0.1 mole) of di-m-tolyldichlorosilane in 25 ml. of toluene. The reaction mixture was maintained at 65° C. during the addition, which required about 20 minutes. The reaction product was stripped to a temperature of 120° C. to remove the solvent and volatile components and yielded a highly viscous, brown liquid weighing 22 g. compared to a theoretical yield of 22.6 g. An infrared analysis of this product showed only a trace of silanol and a good yield of crude hexa-m-tolylcyclotrisiloxane. The viscous liquid was repeatedly diluted with hexane and then concentrated, causing a separation of the solid cyclotrisiloxane in a 70% yield, based on theoretical. A 15.8 g. sample of the hexane-treated cyclotrisiloxane was recrystallized by the same procedure as described in Example 1 using about 30 ml. of acetonitrile. The cyclotrisiloxane which resulted from the recrystallization had a melting point of from 75° C.– 79° C.

Example 11

This example illustrates the production of poly(m-trifluoromethylphenyl)cyclosiloxanes. A solution was prepared containing 8 g. (0.1 mole) of dimethylsulfoxide in 75 ml. toluene. To this solution was added, dropwise, while stirring, a solution containing 19.5 g. (0.05 mole) of bis(m-trifluoromethylphenyl)dichlorosilane in 25 ml. of toluene. During the addition, the reaction mixture was maintained at 65° C., the addition taking place over a period of about 15 minutes. An infrared spectrum of the mixture, which weighed 16 g. compared to a theoretical yield of 16.7 g., showed a slight trace of silanol and a strong peak at 9.8 microns, indicative of a cyclic trisiloxane. The V.P.C. scan showed only three peaks: the product distribution was 61.5% of the hexa(m-trifluoromethylphenyl)cyclotrisiloxane, 35.5% of the octa(m-trifluoromethylphenyl)cyclotetrasiloxane, and 3% deca(m-trifluoromethylphenyl)cyclopentasiloxane. The product can be purified by fractional distillation in a manner similar to that described in Example 8.

While the process is generally applicable to the formation of siloxanes from chlorosilanes, only the reactions with dichlorosilanes have been shown. Though the sulfoxide reaction method is applicable to monochlorosilanes and to trichlorosilanes, the products formed and the yields realized are not significantly different from those obtained using standard methods of hydrolysis.

The cyclotrisiloxanes formed by the method of the present invention are particularly useful in the formation of high molecular weight polymers suitable for use in the preparation of elastomers.

While specific embodiments of the invention have been shown and described, the invention should not be limited to the particular compositions shown. It is intended, therefore, by the appended claims, to cover all modifications within the spirit and scope of this invention.

What I claim as new and desire to secure by Letters Patent of the United States is:

1. The method of preparing a cyclotrisiloxane of the formula:

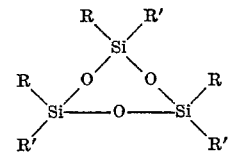

where R and R' are each selected from the group consisting of methyl, phenyl, m-tolyl, and m-trifluoromethylphenyl; comprising reacting a silane having the formula:

where R and R' are as previously defined, with a diorganosulfoxide having the formula:

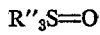

where each R" is selected from the group consisting of alkyl radicals having 1 to 4 carbon atoms, phenyl radicals, benzyl radicals, chlorophenyl radicals, and further radicals where two R" radicals taken together with the

groups form a heterocyclic ring containing one sulfur atom and a 5 to 6 carbon atom alkylene chain, at least one of said R" substituents having an aliphatic alpha-hydrogen atom; in a solvent solution, free of catalyst, at a temperature below the decomposition point of said sulfoxide, and recovering the cyclotrisiloxane from the reaction mixture.

2. The method of preparing cyclotrisiloxanes having the formula:

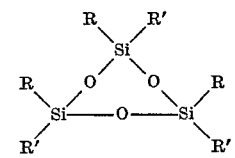

where R and R' are each selected from the group consisting of alkyl radicals having 1 to 3 carbon atoms; alkenyl radicals having 2 to 3 carbon atoms; alkynyl radicals having 2 to 3 carbon atoms; cycloalkyl radicals selected from the class consisting of cyclohexyl and cyclopentyl radicals; aryl radicals selected from the class consisting of phenyl, naphthyl, biphenylyl, tolyl, xylyl and ethylphenyl radicals; mononuclear aralkyl radicals, the alkyl substituents of which have a chain length of 1 to 2 carbon atoms; halogenated derivatives of the above radicals; cyanoalkyl radicals having 3 to 4 carbon atoms; and hydrogen, comprising reacting a silane having the formula:

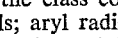

where R and R' are as previously defined, with a diorganosulfoxide having the formula:

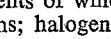

where each R" is selected from the group consisting of alkyl radicals having 1 to 4 carbon atoms, phenyl radicals benzyl radicals, chlorophenyl radicals, and further radicals where two R'' radicals taken together with the

groups form a heterocyclic ring containing one sulfur atom and a 5 to 6 carbon atom alkylene chain, at least one of said R'' substituents having an aliphatic alpha-hydrogen atom; in a solvent solution, free of catalyst, at a temperature below the decomposition point of said sulfoxide, and recovering the cyclotrisiloxane from the reaction mixture.

3. The method of claim 1 wherein R and R' are phenyl and R'' is methyl, said reaction being conducted at a temperature below 80° C.

4. The method of claim 2 wherein the ratio of said sulfoxide to said silane is from 1.5:1 to 3.0:1.

5. The method of claim 4 wherein said ratio is from 1.7:1 to 2.2:1.

6. The method of claim 2 wherein said solvent is selected from the group consisting of aromatic and substituted aromatic compounds.

7. The method of claim 1 wherein R and R' are m-tolyl and R'' is methyl.

8. The method of claim 1 wherein R is methyl, R' is phenyl, and R'' is methyl.

9. The method of claim 1 wherein R and R' are m-trifluoromethylphenyl and R'' is methyl.

10. The method of claim 2 wherein said silane is added to said sulfoxide.

References Cited

UNITED STATES PATENTS

| 2,474,444 | 6/1949 | Taylor. | |
| 2,833,801 | 5/1958 | Holbrook | 260—448.2 |
| 2,997,457 | 8/1961 | Kantor | 260—448.2 XR |

TOBIAS E. LEVOW, *Primary Examiner.*

P. F. SHAVER, *Assistant Examiner.*